United States Patent Office 2,834,681
Patented May 13, 1958

2,834,681

METHOD OF MAKING A FRUIT CONFECTION

Frank O. Kreager, deceased, late of Pullman, Wash., by Homer Dana, administrator, Pullman, Wash.

No Drawing. Application June 3, 1955
Serial No. 513,152

3 Claims. (Cl. 99—102)

The present invention relates to a method of making a fruit confection. The desirability of using fruits such as apples, pears, etc. as the basic ingredients of confections has long been recognized. However, the processes heretofore employed have not been able for one thing to retain the delicate natural flavor of the fruit itself and therefore have not come into substantial universal use.

It is the purpose of the present invention to provide an effective process for impregnating the natural fruit principally with sugar in such a way that the resulting combination retains the distinctive natural fruit flavor together with a pleasing and palatable texture. This combination is important. Processes heretofore employed have not been able to reflect in the confection both the original flavor and the fibrous texture of the fruit. In the present invention, a method of processing is employed which retains the fibrous texture of the fruit and which avoids the use of bleaching chemicals or of synthetic coloring and flavors. By this process substantially all of the food value of the ingredients is retained.

The nature of the invention will appear more fully from the following description and specific example. However, it should be understood that in referring to a particular fruit hereinafter, such reference is not intended as a limitation. The invention applies to a great variety of fruits such as apples, pears, cherries, and such other fruits as have a suitable, fibrous structure in their raw state.

In carrying out the invention the initial step is to prepare the fruit for processing by removing the skin and seeds. For example, take apples. Good fruit specimens are selected and they should not be so over ripe as to be mealy. These apples are peeled, cored and sliced. Small apples should be sliced into quarters, and large apples into eighths, however, these slices should not be too thin for best results.

The fruit as it is being sliced is placed promptly in a salt water solution, the concentration of which is in the order of one tablespoonful of salt to a quart of cold water. This serves both to prevent discoloration of the fruit and to sharpen the natural flavor. As soon as sufficient fruit is prepared, it is removed from the salt water solution and put in a solution of cane or beet sugar and cold water in ratio of about half sugar and half water by volume measure. The fruit is left to soak for a period of from four to ten hours until the cold water sugar solution complete impregnates the fruit pieces. The riper fruit does not require as long a period of soaking; the riper the fruit, the shorter is the soaking period required for thorough impregnation. At the conclusion of the soaking period osmosis has resulted in the injection of the sugar solution into the cells of the fruit. The next step is to boil the fruit in syrup.

The syrup is prepared by boiling commercial cane or beet sugar of good quality in an equal weight of water until thoroughly dissolved. This ratio of sugar to water may be varied between 40 and 60%, depending upon the kind of fruit to be processed. While still hot one may add lemon juice in the ratio of about one lemon to two quarts of syrup and mix thoroughly. The lemon juice appears to accentuate the natural flavor of the fruit in the finished product. Cinnamon may be added at this time. Let the syrup cool to room temperature before using.

The fruit is then transferred to the previously prepared sugar syrup and boiled first vigorously and then more slowly, until the meat fiber of the fruit is semi-translucent. The boiling slows down as the syrup thickens, and sometimes it requires the addition of water to continue the boiling. The boiling period must continue for as much as 45 minutes, depending upon the kind and quality of the fruit and upon the altitude, which in turn determines the boiling temperature. Boiling is completed when the fruit becomes semi-translucent. The fruit is allowed to stand in the syrup until the temperature has dropped to about 150 degrees F. Then the syrup is drained off and the fruit is left to cool down to room temperature. During this time it may be spread in a single layer on a screen or rack tray for drying.

The screen or rack of fruit is placed in a suitable dehydrator for drying by means of circulated hot air. This step of the process is vitally important in assuring the best quality of the product. The initial air temperature may be as high as 300 to 350 degrees F., but this must shortly be reduced gradually or step by step to about 140 degrees F. to prevent caramelization of the sugar. When the pieces of fruit show no loose moisture when broken, they are sufficiently dried and are ready to be removed, or left to cool to room temperature. The pieces can then be used or packed for storage. If desired the individual pieces may be dusted with sugar or coated with various coatings such as chocolate, caramel, etc.

The resulting confection as in the case of apples in the above example, consists of a soft meaty texture which is smooth and translucent. It has a recognizable natural fruit flavor which is identified with the variety of the fruit used. Other fruits are prepared in a similar manner by removing the skin and seeds and cutting the fibrous body into pieces of the desired size.

The invention claimed is:

1. A method of making a fruit confection from fruits having a fibrous structure in their raw state which comprises first cutting the fruits into pieces of desired size, immediately immersing the cut fruit pieces in salt water, thereafter transferring the pieces to a cold water sugar solution and soaking the particles in the cold water sugar solution until the pieces are thoroughly impregnated with said solution, thereafter transferring the impregnated fruit pieces into a previously boiled cold sugar syrup and boiling the syrup with the fruit pieces therein until the fruits are cooked to a semi-translucent state, about 45 minutes, cooling the syrup and fruit pieces to about 150 degrees F., then removing the fruit pieces from the syrup and drying them in hot air at a temperature below caramelization temperature of the sugar until they show no loose moisture when broken.

2. A method of making a fruit confection from fruits having a fibrous structure in their raw state which comprises immersing previously prepared raw peeled pieces of the fruit in a cold water sugar solution made up of half sugar and half water by volume, the sugar being of the group consisting of cane sugar and beet sugar, soaking the fruit in the cold water sugar solution for a period of four to ten hours, transferring the fruit to a previously boiled and cooled syrup composed of about equal parts by weight of water and sugar, the sugar being of the class composed of cane sugar and beet sugar, boiling the fruit syrup mixture for a period of about 45 minutes thereby cooking and bringing the fruit to a semi-translucent state, cooling the fruit-syrup mixture to 150 degrees F. then draining the syrup off, thereafter cooling the fruit to room temperature and finally drying the fruit with hot air at a temperature above 140 degrees.

3. A method of making a fruit confection from fruits having a fibrous structure in their raw state which comprises immersing previously prepared raw peeled pieces of the fruit in a cold water sugar solution made up of half sugar and half water by volume, the sugar being of the class composed of cane sugar and beet sugar, soaking the fruit in the cold water sugar solution for a period of four to ten hours, transferring the fruit to a previously boiled and cooled syrup composed of about equal parts by weight of water and sugar, the sugar being of the group consisting of cane sugar and beet sugar, boiling the fruit syrup mixture for a period of about 45 minutes thereby cooking and bringing the fruit to a semi-translucent state, cooling the fruit-syrup mixture to 150 degrees F. then draining the syrup off, thereafter cooling the fruit to room temperature and finally drying the fruit first with hot air at a temperature above 300 degrees F., then gradually reducing the air temperature as the fruit dries to 140 degrees F. and continuing the drying until the fruit shows no free moisture when broken.

References Cited in the file of this patent

UNITED STATES PATENTS

| | | |
|---|---|---|
| 1,550,321 | Nichols | Aug. 18, 1925 |
| 1,631,017 | Crawford | May 31, 1927 |
| 1,906,295 | Wickenden | May 2, 1933 |
| 2,624,676 | Mako | Jan. 6, 1953 |

OTHER REFERENCES

"Commercial Fruit and Vegetable Products," by Cruess, third edition, McGraw-Hill Book Co., Inc., N. Y., 1948, pages 421–423.